(12) United States Patent
Dolganow et al.

(10) Patent No.: US 9,232,381 B2
(45) Date of Patent: Jan. 5, 2016

(54) SYSTEM AND METHOD OF SERVING GATEWAY HAVING MOBILE PACKET PROTOCOL APPLICATION-AWARE PACKET MANAGEMENT

(71) Applicants: Andrew Dolganow, Kanata (CA); Steven Edward Morin, Ottawa (CA); Keith Allan, Kanata (CA)

(72) Inventors: Andrew Dolganow, Kanata (CA); Steven Edward Morin, Ottawa (CA); Keith Allan, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 192 days.

(21) Appl. No.: 13/754,258

(22) Filed: Jan. 30, 2013

(65) Prior Publication Data

US 2013/0142123 A1 Jun. 6, 2013

Related U.S. Application Data

(63) Continuation of application No. 12/200,711, filed on Aug. 28, 2008, now Pat. No. 8,477,718.

(51) Int. Cl.
| | |
|---|---|
| *H04W 4/24* | (2009.01) |
| *H04W 48/00* | (2009.01) |
| *H04W 4/00* | (2009.01) |
| *H04L 29/06* | (2006.01) |
| *H04W 80/04* | (2009.01) |
| *H04W 88/00* | (2009.01) |
| *H04W 92/02* | (2009.01) |

(52) U.S. Cl.
CPC .............. *H04W 4/24* (2013.01); *H04L 69/22* (2013.01); *H04W 4/001* (2013.01); *H04W 48/17* (2013.01); *H04W 80/04* (2013.01); *H04W 88/005* (2013.01); *H04W 92/02* (2013.01)

(58) Field of Classification Search
CPC ...................................................... H04W 4/24
See application file for complete search history.

(56) References Cited

U.S. PATENT DOCUMENTS

| | | | |
|---|---|---|---|
| 8,345,595 B1 * | 1/2013 | Chau et al. | 370/328 |
| 2003/0204599 A1 | 10/2003 | Trossen et al. | |
| 2006/0233101 A1 * | 10/2006 | Luft et al. | 370/229 |
| 2007/0220251 A1 | 9/2007 | Rosenberg | |
| 2008/0059635 A1 | 3/2008 | Seiferth et al. | |
| 2009/0248785 A1 * | 10/2009 | Gemelos et al. | 709/201 |

FOREIGN PATENT DOCUMENTS

| | | |
|---|---|---|
| AU | 2003225472 A1 | 11/2003 |
| CA | 2604627 A1 | 10/2006 |
| CA | 2662524 A1 | 3/2008 |
| EP | 1499992 A1 | 1/2005 |
| EP | 1869828 A1 | 12/2007 |
| EP | 2064832 A1 | 6/2009 |
| WO | 03091900 A1 | 11/2003 |
| WO | 2006/108281 A1 | 10/2006 |
| WO | 2008/025157 A1 | 3/2008 |

OTHER PUBLICATIONS

System and Method of Serving Gateway Having Mobile Packet Protocol Application-Aware Packet Management; Notice of First Office Action, Chinese Office Action, March 5, 2013, pp. 1-6.

* cited by examiner

*Primary Examiner* — Sulaiman Nooristany
(74) *Attorney, Agent, or Firm* — Kramer & Amado, P.C.

(57) ABSTRACT

Mobile protocol packets, with a header field and a payload field, are communicated from a user mobile equipment to an application-aware serving gateway. The application-aware mobile protocol serving gateway detects header information in the header field and application information in the payload field to manage the mobile protocol packets based on a policy.

10 Claims, 6 Drawing Sheets

SYSTEM AND METHOD OF SERVING GATEWAY HAVING MOBILE PACKET PROTOCOL APPLICATION-AWARE PACKET MANAGEMENT

CROSS-REFERENCE TO RELATED APPLICATIONS

This application is a continuation of parent U.S. application Ser. No. 12/200,711 filed on Aug. 28, 2008. The entire disclosure of the prior application is hereby incorporated by reference herein in its entirety.

TECHNICAL FIELD

Embodiments relate generally to packet based communications within networks, including deep packet inspection for communication associated with Long Term Evolution (LTE) networks.

BACKGROUND

The volume of traffic through mobile wireless networks connected to the Internet is high and is projected to become much higher. Reasons include the increasing variety of devices being introduced as or transformed into wireless mobile user equipment, and the increasing variety of services available through the Internet. As one illustrative example, in addition to devices such as personal digital assistants (PDAs) and laptops, new digital cameras may be directly connected, via built-in wireless networking interfaces, for uploading images, and vehicle on-board computer systems, many having subscription-based added services, are becoming more commonplace.

One primary goal of such mobile user equipment and their related systems is global mobility, meaning reliable, secure connection across all geographical areas, with roaming ability, to a continually broadening range of services. Illustrative examples of such services include e-mail, web browsing, virtual office networking, publish-subscribe push and push-pull systems, telephony communications, and various web business services.

Another primary goal is manageability from the perspective of the service providers. Manageability includes accurate monitoring of use and of the services provided. This in turn assists service providers in quality control, and in providing flexible, accurate, use-based billing.

The Universal Mobile Telecommunication System (UMTS), developed under the Third Generation Partnership Project (3G) cellular network standard, was developed in view of these and other goals.

The Long Term Evolution (LTE), sometimes referred to as "4G," is foreseen as a next significant step toward the goals of global mobile service for the user, and of accurate monitoring, billing, controls and maintenance of communication traffic. Also, increased adoption of certain services, such as Multimedia Online Gaming (MMOG), mobile TV, mobile podcasting, and various streaming media, has given additional impetus to LTE.

LTE may not yet be an actual official standard, but its specification is sufficiently complete and fixed that significant development efforts, including construction and testing toward large-scale commercial embodiments, are underway by major service providers.

Related Art FIG. 1 shows an illustrative example of an LTE system architecture, generally labeled as 10. The overall system architecture of system 10, in accordance with the LTE is an all-packet system, currently referred to in the industry as the Evolved Packet System (EPS).

Referring to Related Art FIG. 1, the representative example LTE system 10 includes a plurality of evolved Radio Access Networks (E-UTRANs), such as the one representative E-UTRAN 12, each composed of an evolved NodeB, (eNodeB) base station 12A communicating to a plurality of User Equipments (UEs), such as the representative UE 12B, via an evolved Universal Terrestrial Radio Access E-UTRA radio network specification. The E-UTRAN messaging is a packet protocol.

In the LTE architecture, as shown in example 10, Serving Gateway (S-GW) 14 receives, routes and forwards user packets, based on the header information, and acts as the mobility anchor for the user plane during, for example, handovers of a UE 12B from one eNodeB base station 12A to another eNodeB base station 12A. The SGW 14 also manages and stores certain UE contexts such as, for example, provided parameters of the IP bearer services, and E-UTRAN internal routing information. The S-GW 14 also provides replication, based on header information, of UE traffic for purposes of lawful interception. Referring again to example 10 shown in to FIG. 1, in an LTE system a Packet Data Network Gateway (PDN-GW) 16 provides the connectivity by the UEs 12B to a Packet Data Network 18. The PDN-GW 16 of an LTE system performs policy (e.g., of a business entity) enforcement, packet filtering, charging support, packet screening and lawful interception, including deep packet inspection (DPI)-based enforcement, filtering and screening, and lawful interception.

As also shown in the example 10, a typical LTE system includes a Mobile Management Entity (MME) 19 that performs functions including authenticating users, assigning temporary identification to UEs 12, and controlling hand-off of a UE 12 from one eNodeB base station 12A to another eNodeB 12A within the same LTE. Further, a typical LTE system may include, to accommodate earlier systems, a UTRAN network 102 connecting, though a Serving GPRS Support Node (SGSN) 104, to the S-GW 14.

As known in the telecommunication industry, the LTE was developed in view of an ongoing market shift toward all-IP mobile access systems as a solution for mobility, cost reduction and with DPI behind the PDN-GW 16, application-aware monitoring and management for expanded revenue generation options, and availability for more QoS based billing by, for example, charging and by prioritization of packet switching according to application type.

The present inventors have, however, identified certain inherent limitations with the present LTE 16 arising from, for example, and integral to the LTE's basic and fundamentals specification and definition of its Serving Gateway, e.g., the FIG. 1 system 10 S-GW 14, and its PDN gateway, e.g., the system 10 PDN-GW 16.

One of these inherent limitations is that the LTE Serving Gateway, exemplified by the FIG. 1 system 10 S-GW 16, cannot be used as a subscriber enforcement point for any policy that is application dependent, meaning that it is dependent, to any extent, on information obtainable only through DPI-processing of packets received from or destined to the E-UTRAN 12 for all cases of UEs communication. First, the LTE Serving Gateway, such as S-GW 16, cannot be used as such an enforcement point because the Serving Gateway is not capable of performing deep packet inspection. Further, the LTE Serving Gateway cannot be used as an enforcement point such because subscriber enforcement includes discard based on policy, but discarding in front of, instead of behind of, the PDN-GW, after encapsulation into a packet data network format, would make a charging/credit/policy employed logically behind the P-GW inaccurate.

Another limitation is that the SG-W 16 cannot employ a local, packet-content based break-out or other route optimization for traffic requiring application identification and, instead, necessitates that the packets traverse the DPI-enabled PDN-GW 18. This shortcoming may result if difficulty in implementing application-level dependent processing across the system.

Another limitation is that roaming traffic, such as UEs 12B being first handed to one of the e-NodeB 12A base stations of a RAN 12, arrives directly on the S-GW 16, making it further difficult, if not impossible, to apply DPI-based processing on that traffic.

SUMMARY

The present invention provides, among other features, application-based management of mobile protocol packet communications prior to encapsulation and propagation through a packet data network (PDN).

The present invention provides, among these and other features and benefits, various application-based traffic management of mobile packet communications at a mobile protocol gateway, prior to propagation through an interface to a PDN.

According to various features and aspects of various exemplary embodiments, the present invention provides application-based policy management of mobile packet communications including, but not limited to, one or more of application-based discard, application-based prioritization, application-based billing, and application-based forwarding to other mobile network destinations, without propagation through a PDN.

According to various features and aspects of various exemplary embodiments, the present invention provides a hot redundancy, hand-off training and continuing application-aware management of mobile format packets, propagating application-aware analysis data extracted at a first mobile packet protocol serving gateway to a second mobile packet protocol gateway when a mobile user equipment identified as associated with the application-aware analysis data is handed off from the first mobile packet protocol serving gateway, without propagation through a PDN.

According to one aspect of hot redundancy, hand-off training and continuing inspection of packet L2-L7 headers and content, according to one or more exemplary embodiments, a management includes, but is not limited to, header and payload inspection of packets at a first mobile packet protocol serving gateway, to obtain a user identification, which may be direct (e.g., IP address) or indirect (e.g., Service Data Flow identifier) that is used by higher layer network element to correlate the SDF with user, and an application identification associated with a mobile unit and, upon handoff of the mobile unit to a second mobile packet protocol serving gateway, propagating a training data based on the user identification and the application identification from the first mobile packet protocol serving gateway to the second mobile packet protocol serving gateway for use in application-aware packet management, including payload inspection, at the second mobile packet protocol second serving gateway.

The above-described aspect of hot redundancy, hand-off training and continuing application-aware management of mobile protocol packets, according to one or more exemplary embodiments, provides hot redundancy, continuing application-aware management of mobile protocol packets, without loss of information through hand-off of mobile user equipment from one mobile protocol serving gateway to another mobile protocol serving gateway.

As will be understood by persons skilled in the relevant arts based on this disclosure, this and other aspects provide a modified S-GW point DPI-based application-aware policy capable of executing, at least in part, on a single modified S-GW, as well as on a processing environment established by a sequence of mobile protocol serving gateways occurring over the hand-off history from one to another of the mobile protocol serving gateways. As will be understood by persons skilled in the relevant arts, this traffic includes traffic not communicated through the P-GW and, therefore, these other various aspect of the various exemplary embodiments provide DPI-base application-aware policy enforcement not capable of being carried on a P-GW based DPI policy enforcement.

Various exemplary embodiments provide these and other benefits and features through systems comprising, in one or more examples, radio networks communicating mobile format packet data with mobile user equipment, mobile protocol serving gateways interfacing to the radio networks, packet data network gateways interfacing between the serving gateways and data packet network, the serving gateways constructed and arranged to extract and identify application based on packet header information and/or packet payload and, based on the identified application, to prioritize, monitor, forward and otherwise manage communication of the mobile format packets.

According to one aspect, one or more of the above-identified features and benefits of the invention are provided in a system of radio networks interfacing with mobile protocol serving gateways, and a PDN gateways interfacing between the mobile protocol serving gateways and a PDN, by the mobile protocol serving gateways being constructed and arranged to perform an application-aware processing, the processing including receiving, from or to mobile user equipment within the radio networks, mobile protocol packets having a header field and payload field, extract information from the header field and the payload field and generate, based on the extracted information, user identity information and application-type identity information.

According to one aspect, the application-aware processing performed at the mobile protocol serving gateways includes a hot redundancy handoff aspect, wherein at least one of the mobile protocol serving gateways is arranged to generate an application-aware training data based on the identity information and application-type identity information obtained by extraction from the header field and payload field, and upon detecting or receiving a hand-off event associated with a particular mobile user equipment, to propagate the application-aware training data generated from extraction on mobile protocol packets received from or destined to that mobile user equipment, to another mobile protocol serving gateway for all or a subset of application IP flows (i.e. UE control or/and data flows uniquely identified by the IP 5-tuple). Further to this aspect, the other mobile protocol serving gateway is arranged to continue to extract, from additional mobile protocol packets received from or destined to the particular handed off mobile user equipment, header information and payload information and to generate, based on the extracted information and the application-aware training data, a continuing user identifier and a continuing application-type identifier.

DESCRIPTION

Figure 1:
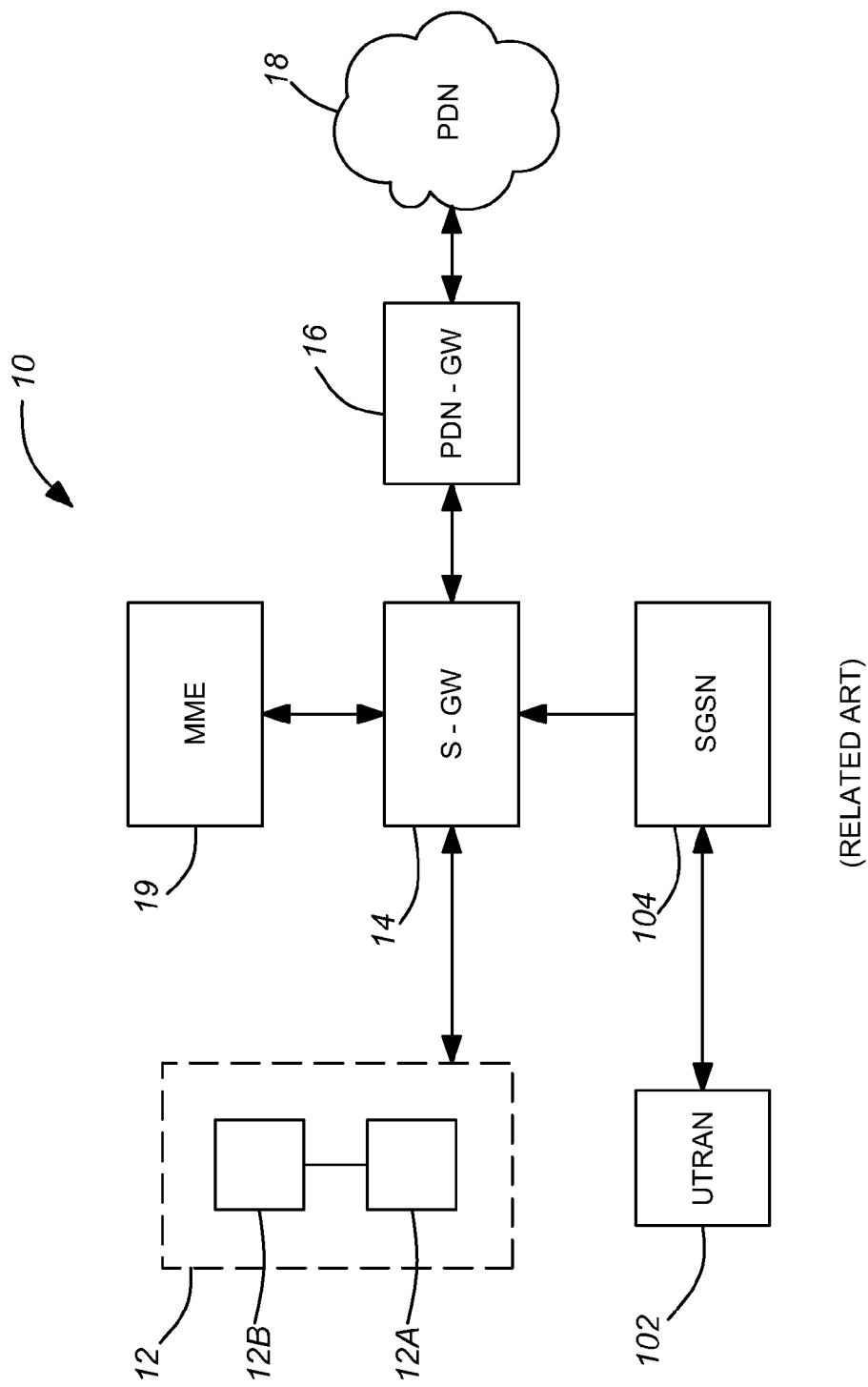
FIG. 1 illustrates an example related art system employing a PDN-side packet inspection based policy control.

The following describes exemplary embodiments and aspects of the invention sufficiently enable persons of skill in the relevant art to practice the invention according to the best mode contemplated by the present inventors.

The particular examples are only for illustrative purposes, to provide an understanding of concepts, guidelines number of alternative and various arrangements and implementations that are within their scope, but that depart from the specific depicted illustrative examples.

To avoid obscuring novel features and aspects, the following description omits various details of methods and techniques known to persons skilled in the relevant arts which, based on this disclosure, such persons will readily select and employ to practice according to the embodiments.

Various embodiments and aspects may be described separately or as having certain differences. Separate description, however, does not necessarily mean the embodiments or aspects are mutually exclusive. For example, a particular feature, function, or characteristic described in relation to one embodiment may be included in other embodiments.

Referring to the drawings, certain example functions and operations according to various exemplary embodiments are graphically represented as blocks but, unless otherwise stated or made clear from the context, the particular arrangement, spacing and size of blocks is not a limitation of hardware implementations for practicing the embodiments.

In the drawings, like numerals and appearing in different drawings, either of the same or different embodiments of the invention, reference functional blocks or system blocks that are, or may be, identical or substantially identical between the different drawings.

The term "engine," as used herein, means any data processing machine capable of accepting an input and processing the input and/or performing operations based on the input, to generate an output in accordance with the function recited for the engine.

The term "data processing machine" includes, but is not limited to, a general purpose programmable computer or computing resource having, for example, one or more data processor cores capable of reading or otherwise receiving machine-executable instructions that, when executed by the processor core, effect a state machine and/or performance other operations to carry out the function recited.

Figure 2:
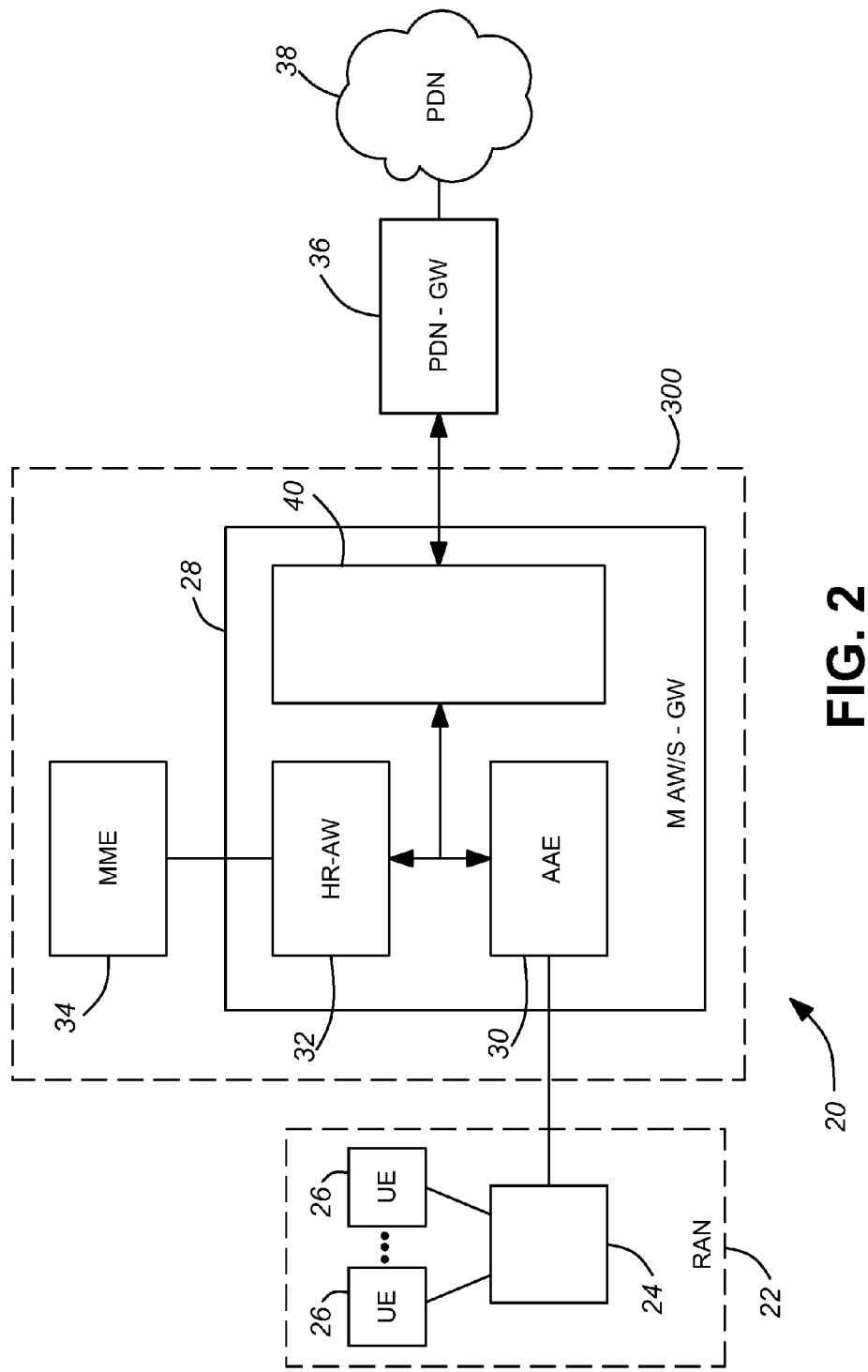
FIG. 2 depicts a functional diagram of one illustrative system according to one or more exemplary embodiments, having an example aspect of an application-aware mobile protocol gateway, the gateway including a DPI based application.

FIG. 2 depicts a functional diagram of one illustrative system 20 according to one or more exemplary embodiments, having an example aspect of an application-aware mobile protocol gateway, the gateway including a DPI based application.

It will be understood that FIG. 2 represents the example system 20 in terms of functional blocks, arranged for purposes of logical description, which may not represent any relative physical size, processing power requirement, location or other spatial relation of any hardware implementing the blocks.

For purposes of illustration of particular aspects and features of one or more embodiments, the example system 20 is described in reference to, and as meeting, except for the described departures from, the Long Term Evolution (LTE) functional specification.

Description in reference to LTE, however, is only for purposes of showing and explaining example certain aspects and features and, as will be readily apparent to persons skilled in the relevant arts based on this disclosure, the invention and various embodiments have applicability to any type of communication network system having radio networks facing an equivalent of server gateways, with the server gateways also facing digital packet network gateways to a digital packet network.

Referring now to FIG. 2, the example system 20 includes one or more radio access networks (RANs) 22 that may be, for example, Evolved Universal Terrestrial Radio Access Network (E-UTRAN) subsystems, each RAN 22 including a base station 24 which may, for example, be an enhanced NodeB (eNodeB) within the meaning of the LTE specification, communicating with one or more user equipments (UEs) 26. The UEs 26 may be, for example, any type of user device capable of communicating with an eNodeB or equivalent type of base station 24 such as, for illustrative examples, a cellular telephone, PDA, laptop computer or vehicle mounted computer with appropriate wireless features.

The UEs 26 and the base station 24 may each include respective transceivers and antennas (not separately shown), and may be constructed and arranged to utilize, for example, Orthogonal Frequency Divisional Multiplexing (OFDM) as a downlink (DL) transmission scheme and a single-carrier transmission (e.g., Single Carrier-Frequency Division Multiple Access (SC-FDMA)) uplink (UL) scheme.

The above-identified example configurations for the base station 24 and UEs 26 are only examples, and are nor any limitation on the base station 24 and UE 26 configuration that may be used in a system or method practicing the invention. It will be understood, upon reading this disclosure, that the configuration of the base station 24 and the UEs 26, other than the communicating being preferably via packets having header fields, or equivalent, and data fields or payload, or equivalent, is not necessarily particularized to the practice of this invention, and may be according to conventional RAN practices known to persons skilled in the relevant arts. Further details are therefore omitted.

Referring to FIG. 2, the example system 20 includes an application-aware serving gateway (AW/S-GW) 28, having deep packet inspection (DPI) processing capabilities described below, constructed and arranged to face the RAN 22 and receive GPRS Tunneling Protocol-User (GTP-U) plane protocol packets, or equivalent, from or to the base station 24 and arranged to perform both shallow and deep packet inspection on the received GTP-U, or equivalent mobile protocol, packets, which may include arranging the packets as a packet stream or sequence based on, for example, the shallow packet inspection, to generate an application awareness data, arbitrarily labeled $AppID_{i,j}$, where the index i identifies a particular user or a particular mobile user equipment UE $26_i$, and the index j identifies application-awareness information including, for example, a particular application. The $App_{i,j}$ data may be stored at, for example, the AW/S-GW 28, for subsequent processing, including hand-off and related hot-redundancy processing described in greater detail in later sections.

With continuing reference to FIG. 2, in the example system 20, the packet inspection and other application aware processing of the A/S-GW 28, including generation and storage of $App_{i,j}$, may be performed by, for example, a deep packet inspection based application awareness engine (AAE) 30. The AAE 30 may be readily implemented by persons skilled in the relevant art, upon reading this disclosure by, for example, supplementing and appropriately modifying a known implementation of a server gateway that faces a mobile protocol network such as, for example, a known implementation of the S-GW 16 of the FIG. 1 example LTE system, 10, with a conventional PDN side DPI and related application awareness processing engine modified, in a manner that will be understood by skilled persons based on this disclosure, to process mobile protocol packets.

A person skilled in the relevant art has a working knowledge of application aware processing, as performed in a PDN, and, in view of this disclosure, will understand that the AAE 30 may be arranged to perform shallow packet inspection and DPI such that the $AppID_{i,j}$ data may also include session identifier information.

With continuing reference to FIG. 2, the AAE 30 application-aware processing that generates $AppID_{i,j}$ may include shallow packet inspection having, for example, a 5-tuple user/application identifier information, and a DPI drilling down to extract application information such as, for example information within the layer "2" though "7" in the OSI layer model, or equivalent of the GTP-U or equivalent mobile-format packets. The 5-tuple information may comprise, described in terms of the OSI model source IP address, destination IP address, source IP port, destination IP port and IP Protocol, e.g., TCP or UDP. The application information, as identified above, includes information from the OSI layer "2" through "7" or equivalent.

Methods and techniques for extracting 5-tuple user/application information, and for extracting application information from an OSI layer "2" through "7" or equivalent, of PDN packets in PDN side application-aware processing, are known to persons skilled in the relevant art and, based on this disclosure, necessary and appropriate changes and modifications to such known methods and techniques to extract such information from mobile protocol packets, e.g., GTP-U, in an A/S-GW 28 according to the present invention will be understood and, therefore, further details of such processing are not necessary to recite for such persons to practice the present invention.

Referring to FIG. 2, the example system 20 may also include an MME 34 that may, for example, be substantially identical to the MME 19 of the related art FIG. 1. The operation of the MME 34 may, in addition to the operations performed by the related art LTE MME 19, include further arrangement for one aspect of various exemplary embodiments having hot redundancy application aware processing, from one AW/S-GW 28 to another AW/S-GW 28, in association of a hand-off of a given user mobile equipment from the former AW/S-GW 28 to the latter AW/S-GW 28.

Referring to FIG. 2, the example system 20 may also include a PDN-GW 36 that may, for example, be substantially identical to the PDN-GW 36 of the related art FIG. 1, connecting to a PDN such as 38. Functional block 40 within the AW/S-GW 28 represents functions of converting mobile protocol packets of the protocol received from the RAN 12, on which the AAE 30 operates as described above, to a different protocol if, for example, such a protocol is required or specified for input to the PDN-GW 38.

With continuing reference to FIG. 2, according to one or more aspects of various exemplary embodiments, one aspect provides hot redundancy application awareness processing for all or a subset of $AppID_{i,j}$ by providing a plurality of the application-aware serving gateways with a hot redundancy application-aware processing handoff (HR-AW) engine 32 arranged to transfer, in conjunction with hand-off of a mobile user equipment UE $26_i$ from one AW/S-GW 28 to another AW/S-GW 28, an application-aware processing training data Training($AppID_{i,j}$), reflecting or based on an $AppID_{i,j}$ generated or being generated at the handing off AW/S-GW 28.

Further to the above-described and other aspects, the AAE 30 of each AW/S-GW 28 may be arranged to receive Training ($AppID_{i,j}$) from another AW/S-GW 28 in conjunction with being handed a mobile user equipment from the other AW/S-GW 28, and may be arranged to train or otherwise initialize its application-aware (e.g., DPI) processing based on the received Training($AppID_{i,j}$) to continue, after being handed the mobile user equipment $UE_i$, processing the mobile format packets the AAE 30 receives from or for that $UE_i$.

According to one aspect, the MME 34 controls and conducts the transfer of Training($AppID_{i,j}$) from one AW/S-GW 28 to one or more other AW/S-GW 28 units. Example operations of example embodiments having this aspect are further described in later sections of this disclosure.

According to another aspect, the HR-AW engines 32 may be configured to communicate Training($AppID_{i,j}$) from one AW/S-GW 28 to other AW/S-GW 28s, without, or without direct action of an MME for all or a subset of $AppID_{i,j}$. Example operations on and according to example embodiments having this aspect are further described in later sections of this disclosure.

As will be understood by persons skilled in the relevant arts, benefits are obtained from providing a plurality of AW/S-GW 28s with this aspect of having the HR-AW engine 32 and the AAE 30 arranged to receive Training($AppID_{i,j}$) from another of the AW/S-GW 28s and train or initialize an application aware processing on packets from/to the particular $UE_i$ associated with Training ($AppID_{i,j}$). Such benefits include, but are not limited to, hot redundancy application aware processing, at the mobile protocol side of the system 20, of a roaming $UE_i$, which further provides benefits including, but not limited to, one or more of application-aware policy enforcement and billing features not practical, or are not possible, with LTE and other (e.g., 3G) PDN-side policy enforcement.

Figure 3:
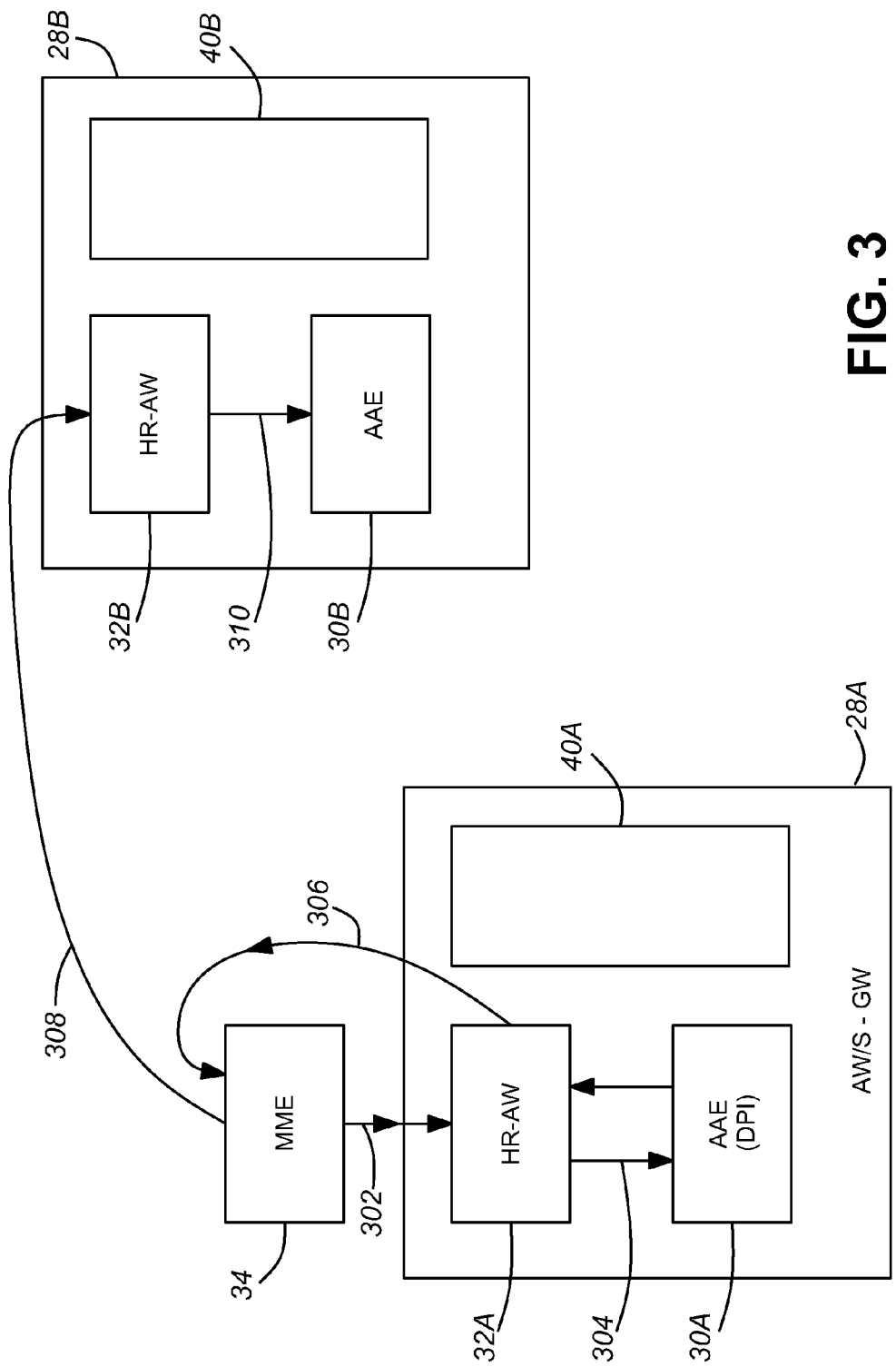
FIG. 3 shows an exploded view of one example aspect of a portion of the FIG. 2 illustrative system, showing operative connections according to one example feature of an application-aware mobile protocol gateway, including a DPI application, having one example aspect of a hot redundancy hand-off feature.

FIG. 3 is an exploded view of region 300 of FIG. 2 in relation to another AW/S-GW 28, showing operative connections according to one example feature of an application-aware mobile protocol gateway, including a DPI application, having one example aspect of a hot redundancy hand-off feature.

Referring to FIG. 3, operative connection 302 from the MME 34 to the AW/S-GW 28 of the FIG. 2 system represents MME 34 communicating handoff instructions to the AW/S-GW 28, for handing off a particular mobile user equipment UE$_n$, assumed as being within the RAN 22 of FIG. 2, to another AW/S-GW, labeled 28B. Operative connection 304 represents communications or other operations between the AAE 30 and the HR-AW engine 32, performed after operative connection 302 initiating handoff of UE$_n$, for collecting the Training(AppID$_{n,j}$) generated by AAE 30 in its DPI and other application-aware processing of mobile protocol packets received from or destined for UE$_n$. Operative connection 306 represents communication of Training(AppID$_{n,\ j}$) from AW/S-GW 28 to the MME 34. Operative connection 308 represents communication of the Training(AppID$_{n,\ j}$) from the MME 34 to the AW/S-GW 28B. Connection 308 may also include conventional LTE MME handoff instructions for LTE serving gateways to handoff mobile user equipment UE$_n$. Operative connection 310 represents communications and other operations between the AAE 30B and the HR-AW engine 32B of AW/S-GW 28B, for training or otherwise initializing AAE 30B, based on Training (AppID$_{n,j}$), to continue the application-aware processing on mobile protocol packets for all or a subset of application flows from/to UE$_n$, which were ongoing at AW/S-GW 28 prior to the handoff.

Figure 4:
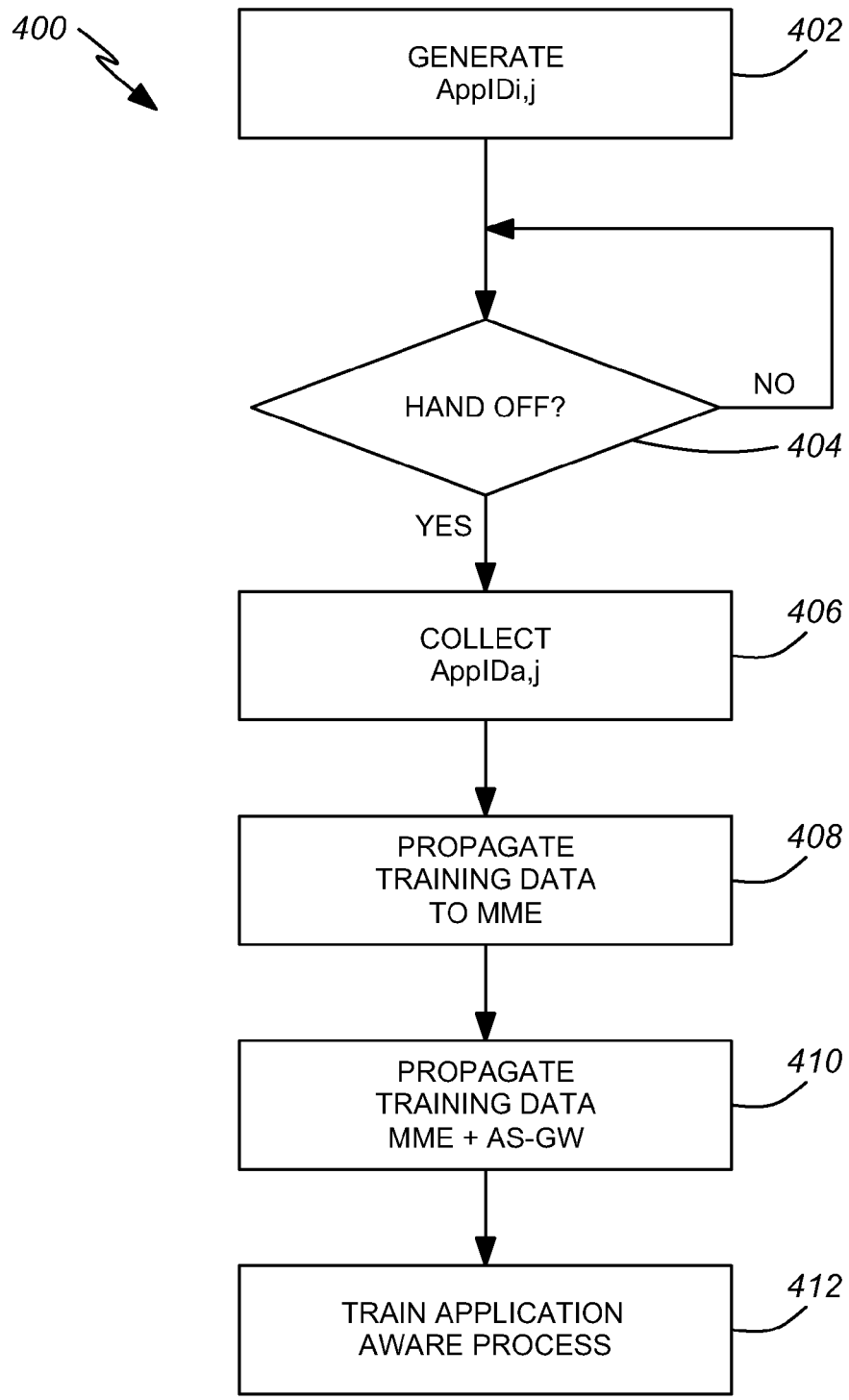
FIG. 4 shows a process flow chart of an example process for an exemplary embodiment having application-aware packet management of mobile protocol packets, at the mobile packet protocol side, including hot redundancy hand-off, practiced on an example environment having an application-aware mobile protocol gateway according to FIG. 3.

FIG. 4 shows a process flow chart of an example process 400 for an exemplary embodiment having application-aware packet management of mobile protocol packets, at the mobile packet protocol side, including hot redundancy hand-off, practiced on an example environment having an application-aware mobile protocol gateway according to FIG. 3.

Figure 5:
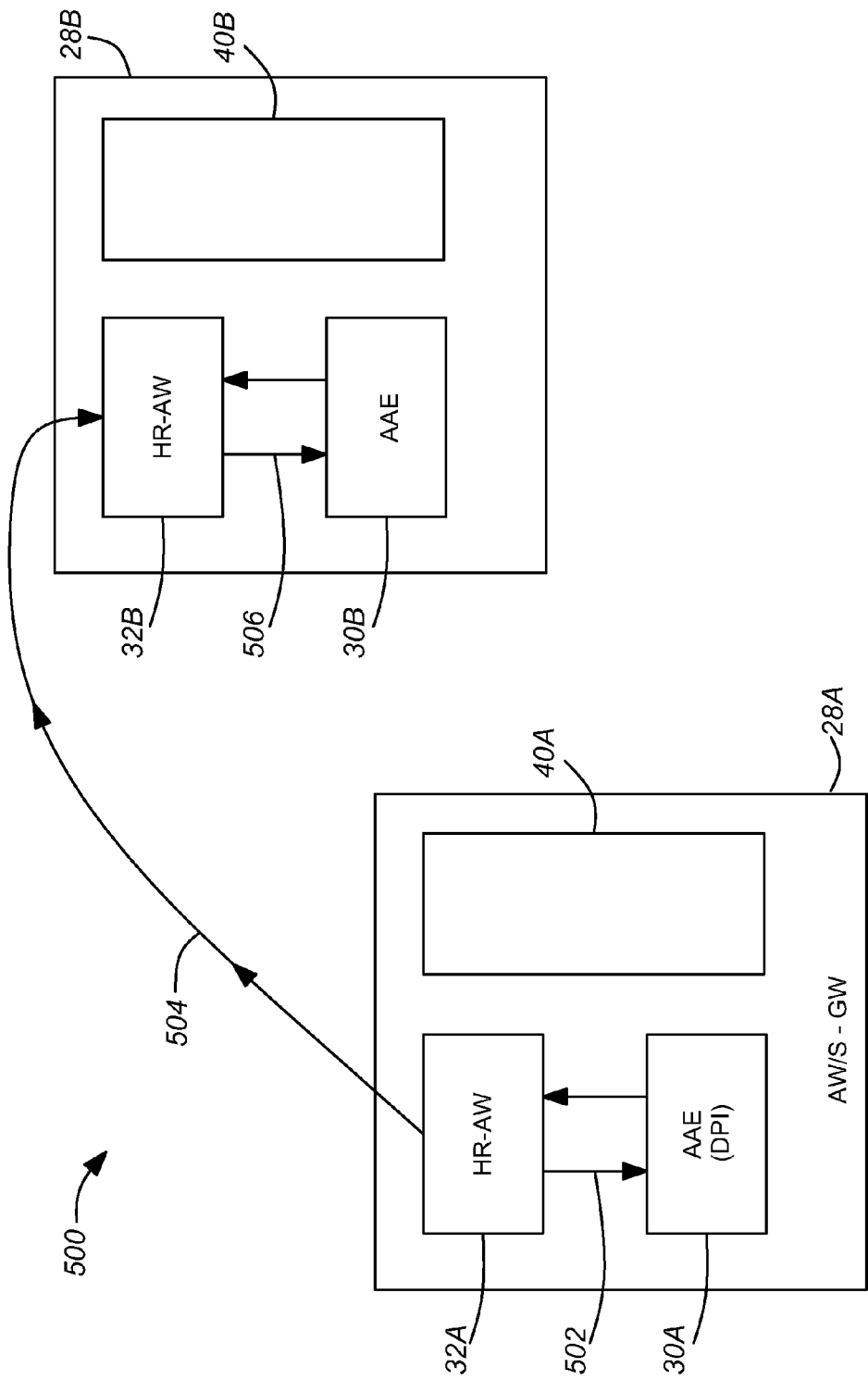
FIG. 5 is an exploded view of another example aspect of a portion of the FIG. 2 illustrative system, showing operative connections according to another example feature of an application-aware mobile protocol gateway, including an aspect having a DPI application, and hot redundancy hand-off.

Referring to FIG. 4, the illustrative operation starts at 402, representing an application-aware process on mobile protocol packet streams from/to each of a plurality of user equipment devices UE including, the processing including detecting, at an application-aware mobile protocol serving gateway such as the FIGS. 2 and 5 AW/S-GW 28, packet header information and packet payload information in the packets and generating one or more data identifying a user and an application such as, for example, AppID$_{i,\ j}$ described above, identifying an i$^{th}$ user and a j$^{th}$ application type. The user identification may be direct (e.g., IP address) or indirect (e.g., Service Data Flow identifier) that is used by higher layer network element to correlate the SDF with user. The user identification information also includes an identifier as to which particular UE or UEs are associated with the user. Referring to FIGS. 2 and 5, generation of AppID$_{i,\ j}$ may be performed at the AAE 30 engine of AW/S-GW 28. The App$_{i,\ j}$ data may be stored at, for example, the AAE 30 engine, for subsequent processing, including hand-off processing at 406, 408 as described in greater detail below.

At 404 an MME, such as the MME 34 of FIG. 2 or equivalent, commands the mobile protocol serving gateway, such as AW/S-GW 28 of FIG. 2, to perform a handoff of a particular mobile user equipment, arbitrarily labeled UE$_q$, to another mobile protocol side serving gateway, such as AW/S-GW 28B of FIG. 3. Referring to FIG. 3, the operative connection 302 may represent an example of the FIG. 4 execution 404.

With continuing reference to FIG. 4, at 406, in response to 404, the AW/S-GW 28 identifies which of the AppID$_{i,\ j}$ have been generated and stored based on packets received from the UEq device, and then that AppID$_{i,\ j}$ data is collected by, for example, the FIG. 2 HR-AW engine 32 from the AAE 30. Referring to FIG. 3, the operative connection 304 may represent an example of the FIG. 4 execution of the 406 collecting of application-aware processing data, e.g., the AppID$_{q,\ j}$ data.

Referring again to FIG. 4, after 406, at 408 a Training (AppID$_q$), which may be AppID$_{q,\ j}$, is transmitted or propagated from the original mobile protocol side serving gateway to the MME such as from AW/S-GW 28 to MME 34 as shown at FIG. 3. The operative connection 306 of FIG. 3 may represent an example of the FIG. 4 execution of propagation 408.

After execution of 408 at FIG. 4, at 410 the Training(AppID$_{q,j}$) is transmitted or propagated from the MME, e.g., the FIG. 2 MME 34, to the newly assigned mobile protocol side serving gateway for UE$_q$ such as, in this example, the AW/S-GW 28B shown at FIG. 3. The operative connection 308 of FIG. 3 may represent an example of the FIG. 4 execution of propagation 410.

Lastly, at 412 of FIG. 4, an application-aware processing is trained, and/or otherwise initialized, at the newly assigned mobile protocol side serving gateway, such as AW/S-GW 28B of this example, whereupon the application-aware processing continues on the packets that AW/S-GW 28B receives from/to UE$_q$ to generate a continuing AppID$_{q,\ j}$.

As can be readily understood from this disclosure, various features, rules, specifications, and options for communicating the application-aware processing data identifying a user and an application type, e.g., AppID$_{i,j}$ or the continuing AppID$_{q,j}$ to, for example, a billing entity or a further policy enforcement entity will be readily apparent.

As one illustrative example, referring to FIG. 2, the AW/S-GW 28B may be configured to generate and transmit a policy-based report (not shown), for example in response to AppID$_{i,\ j}$ meeting one or more given criteria, or rules. According to one aspect, such a policy-based report may be communicated through, for example, the PDN-GW 36, to an entity connected to the PDN 38. According to another example aspect, the policy-based report may be communicated through, for example, the MME 34, in a mobile protocol packet format, to a destination reachable through the mobile protocol packet format side of a network without propagation through a PDN.

FIG. 5 is an exploded view of another example aspect of a portion of the FIG. 2 illustrative system, showing operative connections according to another example feature of an application-aware mobile protocol gateway, including an aspect having, without an MME, a deep packet inspection based application aware packet management, and hot redundant hand-off. The FIG. 5 operative connections, labeled 502, 504 and 506, are referenced in description of an illustrative example operation, such as represented at FIG. 6.

Figure 6:
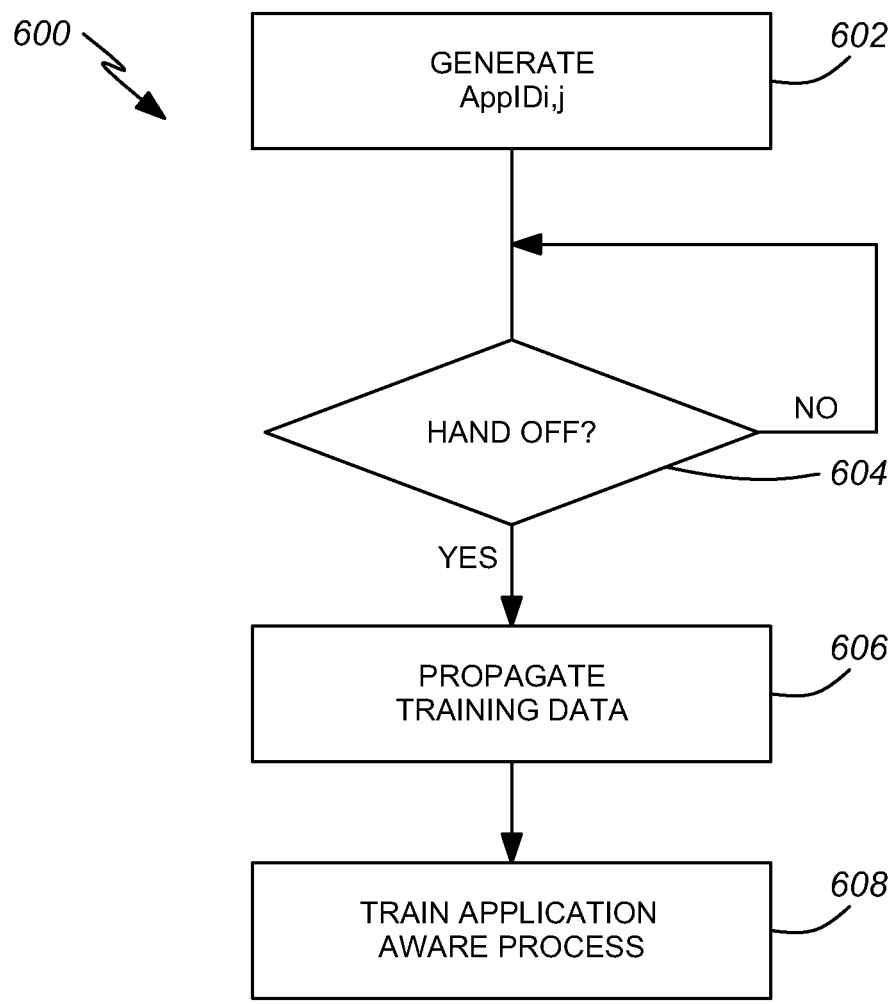
FIG. 6 shows a process flow chart of an example process for an exemplary embodiment having application-aware packet management of mobile protocol packets, at the mobile packet protocol side, including hot redundancy hand-off, practiced on an example environment having an application-aware mobile protocol gateway according to FIG. 5.

FIG. 6 shows a process flow chart of an example process 600 for an exemplary embodiment having application-aware packet management of mobile protocol packets, at the mobile packet protocol side, including hot redundancy hand-off, practiced on an example environment having an application-aware mobile protocol gateway according to FIG. 5.

Referring to FIG. 6, the procedure the illustrative operation starts at 602 with application-aware processing on mobile protocol packet streams from/to a plurality of various mobile user equipment devices UE, the processing including detecting, at an application-aware mobile protocol serving gateway such as the FIGS. 2 and 5 AW/S-GW 28, packet header information and packet payload information in the packets. The 602 application-aware processing includes generating, for each of the plurality of user mobile equipment, one or more data identifying a user and an application such as, for example, AppID$_{i,j}$ identifying an i$^{th}$ user and a j$^{th}$ application type. Referring to FIGS. 2 and 5, generation of AppID$_{i,j}$ may be performed at the AAE 30 engine of AW/S-GW 28.

With continuing reference to FIG. 6, at 604 an externally generated handoff command is received at the application-aware mobile protocol serving gateway generating the data identifying a user and an application, for example AW/S-GW 28 shown in FIGS. 2 and 5 and, in response, at 606 that mobile protocol serving gateway collects the AppID$_{i,j}$ or equivalent data, and propagates the data, as a training application-aware data, e.g., Training(AppID$_{i,j}$), to another application-aware mobile protocol serving gateway such as, for example, AW/S-GW 28B shown in FIG. 5.

Referring to FIG. 5, the operative connections 502 and 504 may represent an example of the FIG. 6 execution of the collecting of application-aware processing data, e.g., the AppID$_{i,j}$ data and propagating that data as, for example, Training(AppID$_{i,j}$), to the other application-aware mobile protocol serving gateway. The collecting 602 and propagating 604 may be performed, for example, by the HR-AW engine 32 of AW/S-GW 28B.

Referring to FIG. 6, at 608 an application-aware processing is trained, and/or otherwise initialized, at the newly assigned mobile protocol serving gateway, such as AW/S-GW 28B of this example, whereupon the application-aware processing continues on the packets that AW/S-GW 28B receives from/to UE$_q$. Referring to FIG. 5, the operative connections 506 may represent an example of the training and continuing application-aware processing 608.

As will be apparent to persons skilled in the relevant arts, details of these commercially available web registry environments, to the extent required by such persons to conform and combine these environments with the present disclosure to practice according to the present invention, are well-known and readily available to such persons and, therefore, are omitted.

We hereby claim:

1. A communication system configured to communicate with mobile user equipment, comprising:
   a base station configured to communicate radio signal messages with the mobile user equipment, and mobile protocol packets based on the radio signal messages, each packet having a header field and a payload field; and
   an application-aware serving gateway, facing the base station, configured to receive the mobile protocol packets, perform deep packet inspection (DPI) on the mobile protocol packets to detect header information in the header field and application information in the payload field, generate a user identifier and an application type identifier based on the detected header information and the detected application information, and apply a policy to the mobile protocol packets based on the user identifier and the application type identifier, wherein the application- aware serving gateway is further configured to generate a policy-based report, according to application-based billing information based on the packets, and forward the policy-based report to a billing entity.

2. The communication system of claim 1, wherein the policy is one of application-based discard, application-based prioritization, application-based billed, and application-based forwarding.

3. The communications system of claim 1, wherein the application-aware serving gateway is configured to generate the policy-based report based on the user identifier and application type identifier meeting one or more criteria.

4. The communication system of claim 1, further comprising:
   a packet data network gateway, wherein the application-aware serving gateway is further configured to generate application-aware training data at the application-aware serving gateway, based on the user identifier, the application type identifier, and the policy, and transfer the application-aware training data from the application-aware serving gateway to the packet data network gateway.

5. A method performed by a serving gateway, the method comprising:
   receiving packets from a base station and a packet data gateway, each packet having a header field and a payload field;
   performing deep packet inspection (DPI) on the packets to detect header information in the header field and application information in the payload field; generating a user identifier and an application type identifier based on the detected header information and the detected application information;
   applying a policy to the packets based on the user identifier and the application type identifier;
   generating application-based billing information based on the packets;
   generating a policy-based report according to the application-based billing information; and
   forwarding the policy-based report to a billing entity.

6. The method of claim 5, wherein applying the policy to the packets comprises:
   discarding at least a portion of the packets based on the policy.

7. The method of claim 5, wherein the policy-based report is generated in response to the user identifier and the application type identifier meeting one or more rules.

8. A serving gateway configured to transport mobile protocol packets between mobile user equipment and a packet data network (PDN) gateway, the packets having at least a header field and a payload field, the serving gateway comprising:
   an application-aware engine configured to detect application information in the payload field, and to generate a user identifier and an application type identifier based on detected header information and the detected application information;
   a packet management engine configured to perform a forwarding of the packets to the mobile user equipment and the PDN gateway according to a policy selected based on the user identifier and the application type identifier, wherein the packet management engine is configured to generate application-based billing information based on the packets and the selected policy, generate a policy-based report according to the application-based billing information, and forward the policy-based report to a billing entity.

9. The serving gateway of claim 8, wherein the packet management engine is configured to discard at least a portion of the packets from the mobile user equipment based on the policy prior to forwarding the packets to the PDN gateway.

10. The serving gateway of claim 8, wherein the packet management engine is further configured to generate an application-aware training data at the application-aware serving gateway, based on the user identifier, the application type identifier, and the selected policy, and transfer the application-aware training data from the application-aware serving gateway to the PDN gateway.

* * * * *